United States Patent
Lu

(10) Patent No.: US 7,543,162 B2
(45) Date of Patent: Jun. 2, 2009

(54) CPU FREQUENCY REGULATING CIRCUIT

(75) Inventor: Wen-Sheng Lu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 241 days.

(21) Appl. No.: 11/309,769

(22) Filed: Sep. 22, 2006

(65) Prior Publication Data
US 2007/0226521 A1 Sep. 27, 2007

(30) Foreign Application Priority Data
Mar. 23, 2006 (CN) .................... 2006 1 0034656

(51) Int. Cl.
G06F 1/00 (2006.01)
G05F 1/00 (2006.01)
(52) U.S. Cl. .................... 713/300; 713/322; 323/284
(58) Field of Classification Search .................. 713/300
See application file for complete search history.

(56) References Cited
U.S. PATENT DOCUMENTS 4,958,117 A * 9/1990 Kerkman et al. ............ 318/805
6,134,167 A * 10/2000 Atkinson ..................... 365/222
6,519,707 B2 * 2/2003 Clark et al. .................. 713/322
6,639,391 B2 * 10/2003 Huang et al. ................ 323/284
2002/0062454 A1 * 5/2002 Fung .......................... 713/300
2007/0057720 A1 * 3/2007 Hand et al. .................. 330/10

FOREIGN PATENT DOCUMENTS

CN          1614530 A          5/2005

* cited by examiner

Primary Examiner—Suresh K Suryawanshi
(74) Attorney, Agent, or Firm—Wei Te Chung

(57) ABSTRACT

An exemplary CPU frequency regulating circuit includes a detecting circuit, a comparing circuit, and an adjusting circuit. The detecting circuit is coupled to a power circuit of a CPU for receiving and amplifying a load voltage. The comparing circuit is coupled to the detecting circuit for comparing the amplified load voltage with a default voltage. The adjusting circuit is coupled between the comparing circuit and the CPU for selecting a CPU frequency according to a result of the comparison. The CPU frequency regulating circuit detects the load voltage of the power circuit of the CPU for selecting an appropriate frequency to the CPU according to a working condition.

13 Claims, 1 Drawing Sheet

CPU FREQUENCY REGULATING CIRCUIT

FIELD OF THE INVENTION

The present invention relates to regulating circuits, and particularly to a CPU frequency regulating circuit.

DESCRIPTION OF RELATED ART

Conventionally, a working frequency of a computer is set by manipulating jumpers or other switches on a motherboard of the computer. The jumpers are changed in accordance with instructions in a user guide of the motherboard to change a CPU multiple frequency factor and to control the frequency generation of a frequency generator. This, however, may be troublesome to ordinary consumers since most people are not familiar with such techniques, and thus although the user may follow the instructions of the user guide, it is common that the computer user cannot perform the frequency modification operation correctly.

An incorrect setting of the working frequency may result in damage to the CPU. Therefore to overcome such a problem, some of the computer motherboard manufacturers provide a solution which allows the computer user to set the multiple frequency factor directly in a window displayed on the computer screen, similar to the general setting operation of the computer BIOS.

The conventional way of setting the working frequency is to perform the operation under the condition that the computer is already booted. The setting operation provides frequency information and a frequency switching address signal, which after being decoded, is stored in a storage device. In response to the frequency information, the storage device generates a corresponding multiple frequency factor signal and a frequency selection signal, which are applied to the CPU, and frequency generator and reset signals are sent from a resetting unit to the CPU and the system chipset to enter hardware-resetting mode. After the resetting operation, the system chip supplies a reset feedback signal to clear the previous status of the resetting unit which permits the CPU and the system chipset to operate based on the newly selected multiple frequency factor and working frequency. Although this way provides an effective switching operation between different frequencies, it requires additional parts, such as the resetting unit and the storage device. This unit and device may not be of a high cost, but still constitute unnecessary cost to the computer main board manufacturers.

What is needed, therefore, is a CPU frequency regulating circuit for selecting a frequency of the CPU automatically at a low cost.

SUMMARY OF THE INVENTION

An exemplary CPU frequency regulating circuit includes a detecting circuit, a comparing circuit, and an adjusting circuit. The detecting circuit is coupled to a power circuit of a CPU for receiving and amplifying a load voltage. The comparing circuit is coupled to the detecting circuit for comparing the amplified load voltage with a default voltage. The adjusting circuit is coupled between the comparing circuit and the CPU for selectively outputting a CPU frequency according to a result of the comparison.

Other advantages and novel features will become more apparent from the following detailed description when taken in conjunction with the accompanying drawings, in which:

DETAILED DESCRIPTION OF THE INVENTION

Figure 1:
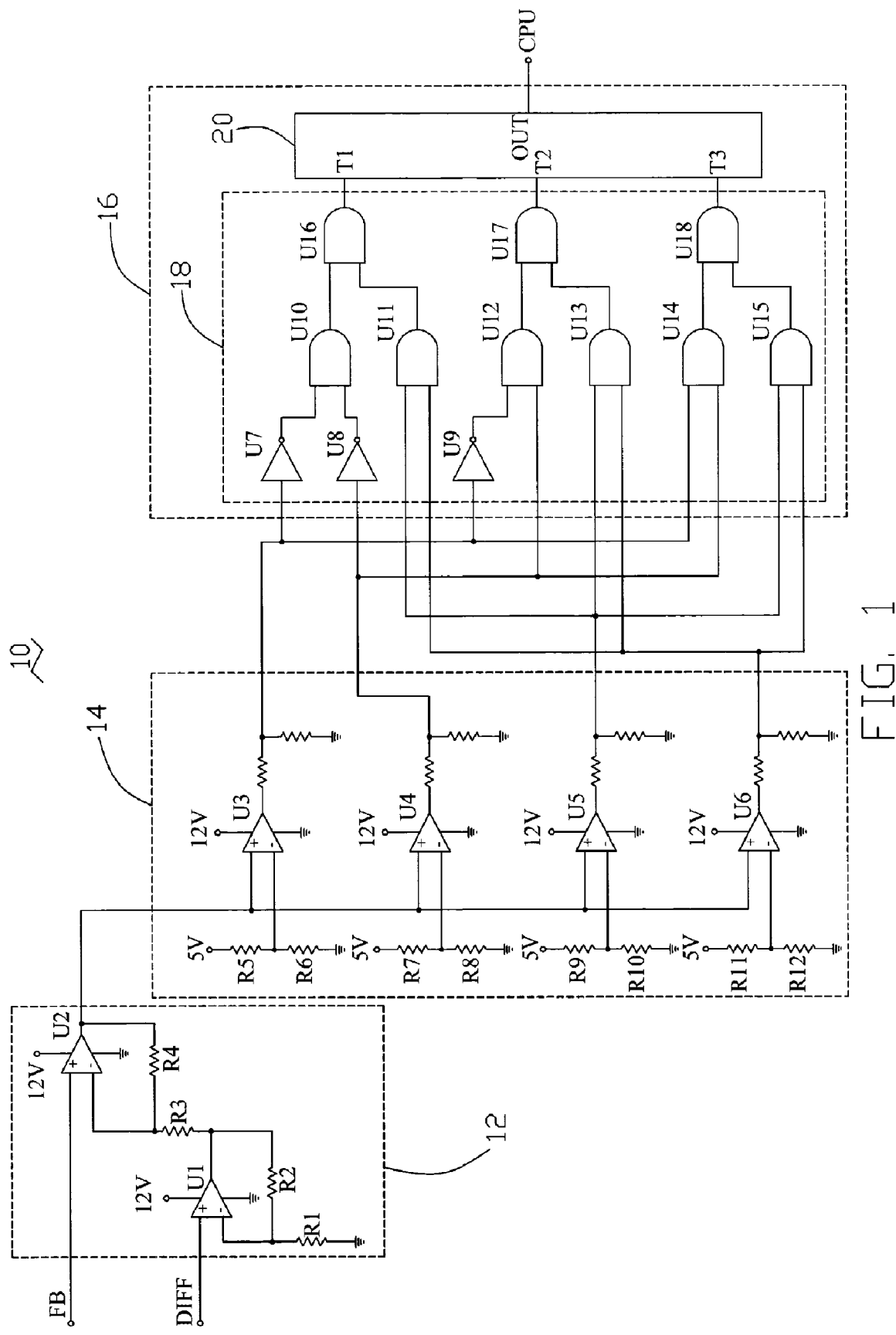
FIG. 1 is a circuit diagram of one embodiment of a CPU frequency regulating circuit in accordance with the present invention.

Referring to FIG. 1, a CPU frequency regulating circuit 10 in accordance with the present invention includes a detecting circuit 12, a comparing circuit 14, and an adjusting circuit 16. The detecting circuit 12 is coupled to a power circuit of the CPU. The comparing circuit 14 is coupled to the detecting circuit 12. The adjusting circuit 16 is coupled between the comparing circuit 14 and the CPU.

The detecting circuit 12 comprises a first comparator U1, and a second comparator U2. The first comparator U1 defines a non-inverting terminal coupled to a differential voltage terminal DIFF in the power circuit of the CPU, an inverting terminal coupled to ground via a first resistor R1, and an output terminal coupled to the inverting terminal via a second resistor R2. The second comparator U2 defines a non-inverting terminal coupled to a feedback terminal FB in the power circuit of the CPU, an inverting terminal coupled to ground via a third resistor R3, the second resistor R2, and the first resistor R1, and an output terminal coupled to the inverting terminal via a fourth resistor R4.

Therefore, an output voltage of the output terminal of the second comparator U2 is found using the following equation: VOUT=(1+R4/R3)*(VFB−VDIFF). Wherein VFB is the voltage of the feedback terminal FB, VDIFF is the voltage of the differential voltage terminal DIFF, and VOUT is the output voltage of the output terminal of the second comparator U2. The output voltage is amplified by adjusting the resistances of the third resistor R3 and the fourth resistor R4. The output voltage should be less than 5V.

The comparing circuit 14 comprises four comparators U3~U6, and eight resistors R5~R12. Each of the comparators U3~U6 has a non-inverting terminal coupled to the output terminal of the second comparator U2. The resistors R5 and R6 are connected between a 5V power source and ground in series, and an inverting terminal of the comparator U3 is coupled to a node between the resistors R5 and R6. The resistors R7 and R8 are connected between a 5V power source and ground in series, and an inverting terminal of the comparator U4 is coupled to a node between the resistors R7 and R8. The resistors R9 and R10 are connected between a 5V power and ground in series, and an inverting terminal of the comparator U5 is coupled to a node between the resistors R9 and R10. The resistors R11 and R12 are connected between a 5V power and ground in series, and an inverting terminal of the comparator U6 is coupled to a node between the resistors R11 and R12.

In this embodiment of the present invention, the resistances of the resistors R5~R12 are approximately 1 Kohm, 4 Kohm, 2 Kohm, 3 Kohm, 3 Kohm, 2 Kohm, 4 Kohm, and 1 Kohm respectively. Therefore, voltages at the inverting terminal of the comparators U3~U6 are respectively 4V, 3V, 2V, and 1V. Each of the comparators U1~U6 defines a power terminal coupled to a 12V power source.

The adjusting circuit 16 comprises a frequency generator 20, and a selecting circuit 18 coupled between the comparing circuit 14 and the frequency generator 20 for selecting an output frequency of the frequency generator 20.

The selecting circuit 18 comprises three NOT gates U7~U9, and nine AND gates U10~U18. The NOT gate U7 has an input terminal coupled to an output terminal of the comparator U3. The NOT gate U8 has an input terminal coupled to an output terminal of the comparator U4. The NOT gate U9 has an input terminal coupled to an output terminal of the comparator U3. The AND gate U10 has a first input terminal coupled to an output terminal of the NOT gate U7, and a second input terminal coupled to an output terminal of the NOT gate U8. The AND gate U11 has a first input terminal coupled to an output terminal of the comparator U5, and a second input terminal coupled to an output terminal of the comparator U6. The AND gate U12 has a first input terminal coupled to an output terminal of the NOT gate U9, and a second input terminal coupled to an output terminal of the comparator U4. The AND gate U13 has a first input terminal coupled to an output terminal of the comparator U5, and a second input terminal coupled to an output terminal of the comparator U6. The AND gate U14 has a first input terminal coupled to an output terminal of the comparator U3, and a second input terminal coupled to an output terminal of the comparator U4. The AND gate U15 has a first input terminal coupled to an output terminal of the comparator US, and a second input terminal coupled to an output terminal of the comparator U6. The AND gate U16 has a first input terminal coupled to an output terminal of the AND gate U10, and a second input terminal coupled to an output terminal of the AND gate U11. The AND gate U17 has a first input terminal coupled to an output terminal of the AND gate U12, and a second input terminal coupled to an output terminal of the AND gate U13. The AND gate U18 has a first input terminal coupled to an output terminal of the fifth AND gate 14, and a second input terminal coupled to an output terminal of the AND gate U15.

The frequency generator 20 comprises a first selection terminal T1 coupled to an output terminal of the AND gate U16, a second selection terminal T2 coupled to an output terminal of the AND gate U17, a third selection terminal T3 coupled to an output terminal of the AND gate U18, and an output terminal OUT coupled to the CPU.

In this embodiment of the present invention, the detecting circuit 12 receives a load voltage at the feedback terminal FB and the differential voltage terminal DIFF, and outputs an amplified load voltage to the comparing circuit 14. If the amplified load voltage is greater than 4V, the comparators U3~U6 will output high-level voltage signals. Therefore, the selecting circuit 18 will select the third selection terminal T3 of the frequency generator 20 to increase a frequency generated by the frequency generator 20 by 1%. If the amplified load voltage is between 3V and 4V, the comparator U3 will output a low-level voltage signal and the comparators U4~U6 will output high-level voltage signals. Therefore, the selecting circuit 18 will select the second selection terminal T2 of the frequency generator 20 to increase the frequency generated by the frequency generator 20 by 0.5%. If the amplified load voltage is between 2V and 3V, the comparators U3 and U4 will output low level voltage signals and the comparators U5 and U6 will output high-level voltage signals. Therefore, the selecting circuit 18 will select the first selection terminal T1 of the frequency generator 20 to increase the frequency generated by the frequency generator 20 by 0.25%. If the amplified load voltage is less than 2V, the comparators U3~U6 will output low-level voltage signals. Therefore, the selecting circuit 18 will not select any selection terminal of the frequency generator 20, and so the frequency generated by the frequency generator 20 will remain the same.

The CPU frequency regulating circuit 10 detects the load voltage of the power circuit of the CPU for selectively outputting an appropriate frequency for the CPU according to a working condition.

It is believed that the present invention and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A CPU frequency regulating circuit comprising:
    a detecting circuit coupled to a power circuit of a CPU for receiving and amplifying a load voltage of the power circuit, the detecting circuit comprising an output terminal configured for outputting the amplified load voltage;
    a comparing circuit coupled to the detecting circuit for comparing the amplified load voltage with a default voltage, the comparing circuit comprises:
        a first comparator;
        a second comparator;
        a third comparator;
        a fourth comparator; and
        four voltage dividing circuits corresponding to the first, second, third, and fourth comparators;
        each of the first, second, third, and fourth comparators having a non-inverting terminal coupled to the output terminal of the detecting circuit, and an inverting terminal coupled to a corresponding one of the four voltage dividing circuits; and
    an adjusting circuit coupled between the comparing circuit and the CPU for selecting a CPU frequency according to a result of the comparison.

2. The CPU frequency regulating circuit as claimed in claim 1, wherein the detecting circuit comprises:
    a fifth comparator having a non-inverting terminal coupled to a differential voltage terminal in a power circuit of the CPU, an inverting terminal coupled to ground via a first resistor, and an output terminal coupled to the inverting terminal via a second resistor; and
    a sixth comparator having a non-inverting terminal coupled to a feedback terminal in the power circuit of the CPU, an inverting terminal coupled to ground via a third resistor, the second resistor, and the first resistor, and an output terminal as the output terminal of the detecting circuit coupled to the inverting terminal via a fourth resistor.

3. The CPU frequency regulating circuit as claimed in claim 2, wherein the adjusting circuit comprises:
    a frequency generator; and
    a selecting circuit coupled between the comparing circuit and the frequency generator for selecting an output frequency of the frequency generator.

4. The CPU frequency regulating circuit as claimed in claim 3, wherein the selecting circuit comprises:
    a first NOT gate having an input terminal coupled to an output terminal of the first comparator;
    a second NOT gate having an input terminal coupled to an output terminal of the second comparator;
    a third NOT gate having an input terminal coupled to the output terminal of the first comparator;

a first AND gate having a first input terminal coupled to an output terminal of the first NOT gate, and second input terminal coupled to an output terminal of the second NOT gate;

a second AND gate having a first input terminal coupled to an output terminal of the third comparator, and a second input terminal coupled to an output terminal of the fourth comparator;

a third AND gate having a first input terminal coupled to an output terminal of the third NOT gate, and a second input terminal coupled to an output terminal of the second comparator;

a fourth AND gate having a first input terminal coupled to the output terminal of the third comparator, and a second input terminal coupled to the output terminal of the fourth comparator;

a fifth AND gate having a first input terminal coupled to the output terminal of the first comparator, and a second input terminal coupled to the output terminal of the second comparator;

a sixth AND gate having a first input terminal coupled to the output terminal of the third comparator, and a second input terminal coupled to the output terminal of the fourth comparator;

a seventh AND gate having a first input terminal coupled to an output terminal of the first AND gate, and a second input terminal coupled to an output terminal of the second AND gate;

an eighth AND gate having a first input terminal coupled to an output terminal of the third AND gate, and a second input terminal coupled to an output terminal of the fourth AND gate; and a ninth AND gate having a first input terminal coupled to an output terminal of the fifth AND gate, and a second input terminal coupled to an output terminal of the sixth AND gate; and wherein the frequency generator comprises:
   a first selection terminal coupled to an output terminal of the seventh AND gate;
   a second selection terminal coupled to an output terminal of the eighth AND gate; and
   a third selection terminal coupled to an output terminal of the ninth AND gate.

5. A frequency regulating circuit for a processor which is capable of working in a plurality of load regions, comprising:
   a detecting circuit coupled to the processor for detecting load of the processor and outputting a voltage signal in response to the load;
   a comparing circuit coupled to the detecting circuit for identifying the load of the processor belonging to which one of the load regions, the comparing circuit comprising;
      at least two voltage dividing circuits;
      at least two comparators corresponding to the at least two voltage dividing circuits; and
      each of at least two comparators having a non-inverting terminal to receive the voltage signal output by the detecting circuit inverting terminal coupled to corresponding one of the at least two voltage dividing circuits, and an output terminal output voltage signal; and
   an adjusting circuit coupled between the comparing circuit and the processor, the adjusting circuit comprising a frequency generator capable of generating a plurality of frequencies, and a selecting circuit configured for receiving the voltage signals output by the output terminal of the comparing circuit and controlling the adjusting circuit to selectively output one of the frequencies corresponding to the identified load to the processor.

6. The frequency regulating circuit as claimed in claim 5, wherein the detecting circuit comprises a pair of comparators respectively coupled to a differential voltage terminal in a power circuit of the processor and a feedback terminal in the power circuit.

7. The frequency regulating circuit as claimed in claim 5, wherein the comparing circuit comprises a plurality of voltage dividing circuits, and a plurality of comparators, each of the comparators having a non-inverting terminal coupled to an output terminal of the detecting circuit to receive the voltage signal output by the detecting circuit, and an inverting terminal coupled to a corresponding one of the at voltage dividing circuits.

8. The frequency regulating circuit as claimed in claim 5, wherein the frequency generator comprises a plurality of selection terminal coupled to the selecting circuit, wherein the selecting circuit comprises a plurality of NOT gates and a plurality of AND gates, cooperating together for processing the voltage signals output by the output terminal of the comparing circuit and controlling the frequency generator to a corresponding frequency of the plurality of frequencies.

9. A CPU frequency regulating circuit comprising:
   a detecting circuit coupled to a power circuit of a CPU for receiving and amplifying a load voltage of the power circuit, wherein the detecting circuit comprises:
      a first comparator having a non-inverting terminal coupled to a differential voltage terminal in a power circuit of the CPU, an inverting terminal coupled to ground via a first resistor, and an output terminal coupled to the inverting terminal via a second resistor; and
      a second comparator having a non-inverting terminal coupled to a feedback terminal in the power circuit of the CPU, an inverting terminal coupled to ground via a third resistor, the second resistor, and the first resistor, and an output terminal coupled to the inverting terminal via a fourth resistor and output the amplified load voltage;
   a comparing circuit coupled to the output terminal of the second comparator to received the amplified load voltage for comparing the amplified load voltage with a default voltage; and
   an adjusting circuit coupled between the comparing circuit and the CPU for selecting a CPU frequency according to a result of the comparison.

10. The CPU frequency regulating circuit as claimed in claim 9, wherein the comparing circuit comprises:
   four voltage dividing circuits;
   a third comparator;
   a fourth comparator;
   a fifth comparator; and
   a sixth comparator;
   each of the third, fourth, fifth, and sixth comparators having a non-inverting terminal coupled to the output terminal of the second comparator, and an inverting terminal coupled to a corresponding one of the voltage dividing circuits.

11. The CPU frequency regulating circuit as claimed in claim 10, wherein each of the four voltage dividing circuits comprises two resistors having different resistance connected in serial between a voltage source and ground, wherein resistances of the resistors of the four voltage dividing circuits are different.

12. The CPU frequency regulating circuit as claimed in claim 10, wherein the adjusting circuit comprises:
   a frequency generator; and
   a selecting circuit coupled between the comparing circuit and the frequency generator for selecting an output frequency of the frequency generator.

13. The CPU frequency regulating circuit as claimed in claim 12, wherein the
   selecting circuit comprises:
      a first NOT gate having an input terminal coupled to an output terminal of the third comparator;
      a second NOT gate having an input terminal coupled to an output terminal of the fourth comparator;
      a third NOT gate having an input terminal coupled to the output terminal of the third comparator;
      a first AND gate having a first input terminal coupled to an output terminal of the first NOT gate, and a second input terminal coupled to an output terminal of the second NOT gate;
      a second AND gate having a first input terminal coupled to an output terminal of the fifth comparator, and a second input terminal coupled to an output terminal of the sixth comparator;
      a third AND gate having a first input terminal coupled to an output terminal of the third NOT gate, and a second input terminal coupled to an output terminal of the fourth comparator;
      a fourth AND gate having a first input terminal coupled to the output terminal of the fifth comparator, and a second input terminal coupled to the output terminal of the sixth comparator;
      a fifth AND gate having a first input terminal coupled to the output terminal of the third comparator, and a second input terminal coupled to the output terminal of the fourth comparator;
      a sixth AND gate having a first input terminal coupled to the output terminal of the fifth comparator, and a second input terminal coupled to the output terminal of the sixth comparator;
      a seventh AND gate having a first input terminal coupled to an output terminal of the first AND gate, and a second input terminal coupled to an output terminal of the second AND gate;
      an eighth AND gate having a first input terminal coupled to an output terminal of the third AND gate, and a second input terminal coupled to an output terminal of the fourth AND gate; and
      a ninth AND gate having a first input terminal coupled to an output terminal of the fifth AND gate, and a second input terminal coupled to an output terminal of the sixth AND gate; and
   wherein
   the frequency generator comprises:
      a first selection terminal coupled to an output terminal of the seventh AND gate;
      a second selection terminal coupled to an output terminal of the eighth AND gate; end
      a third selection terminal coupled to an output terminal of the ninth AND gate.

* * * * *